(12) United States Patent
Oguma et al.

(10) Patent No.: US 7,649,162 B2
(45) Date of Patent: Jan. 19, 2010

(54) OPTICAL FEEDBACK CONTROL UNIT, OPTICAL COMMUNICATION SYSTEM, FEEDBACK CONTROL METHOD, AND RECORDING MEDIUM FOR RECORDING PROGRAM

(76) Inventors: Takefumi Oguma, c/o NEC Corporation, 7-1, Shiba 5-chome, Minato-ku, Tokyo (JP); Hiroki Rikiyama, c/o NEC Corporation, 7-1, Shiba 5-chome, Minato-ku, Tokyo (JP); Koji Asahi, c/o NEC Corporation, 7-1, Shiba 5-chome, Minato-ku, Tokyo (JP)

( * ) Notice: Subject to any disclaimer, the term of this patent is extended or adjusted under 35 U.S.C. 154(b) by 138 days.

(21) Appl. No.: 12/044,650

(22) Filed: Mar. 7, 2008

(65) Prior Publication Data

US 2008/0217511 A1 Sep. 11, 2008

(30) Foreign Application Priority Data

Mar. 9, 2007 (JP) ............................. 2007-059795

(51) Int. Cl.
  *G01J 1/32* (2006.01)
(52) U.S. Cl. .................................... 250/205; 250/201.1
(58) Field of Classification Search ................. 205/205, 205/201.1
  See application file for complete search history.

(56) References Cited

U.S. PATENT DOCUMENTS 4,529,873 A * 7/1985 Ballmer et al. ............ 250/201.1

2003/0216820 A1* 11/2003 Messina ..................... 700/56

FOREIGN PATENT DOCUMENTS

JP 2002185407 A 6/2002
JP 2004116537 A 4/2004

* cited by examiner

*Primary Examiner*—Georgia Y Epps
*Assistant Examiner*—Tony Ko

(57) ABSTRACT

The present invention is to provide an optical feedback control unit for determining an optical output by a feedback control, an optical communication system, a feedback control method, and a recording medium for recording a program. According to the present invention, even when used in the system to which a plurality of nodes are connected, the unstable system may become stable by the proper feedback control without being affected by the optical level change according to the polarized variation or the loss variation. In The optical feedback control unit according to the present invention, an optical output control portion determines an optical output by a feedback control using the result detected by a detection portion, a dead zone not performing the feedback control is set for the difference between the detected value from the detection portion and the control target value, and when the difference between the detected value and the control target value is within the dead zone, a width of the dead zone is set to be wider than that of the dead zone when the difference between the detected value and the control target value is out of the dead zone.

15 Claims, 14 Drawing Sheets

FIG. 1

| VARIABLE ELEMENT AS TRANSMISSION SYSTEM | VARIATION SPAN | VARIATION QUANTITY |
|---|---|---|
| BREAKDOWN / SETTING MODIFICATION | SHORT | LARGE |
| POLARIZED VARIATION | SHORT – MEDIUM | SMALL – MEDIUM |
| PART DEGRADATION | LONG | SMALL – LARGE |
| SEASON VARIATION | LONG | SMALL – MEDIUM |
| OFFSET OF PART / TRANSMISSION PATH FROM DESIGN VALUE | ENDLESS | SMALL – LARGE |

FIG. 3
(a) LINEAR CONFIGURATION
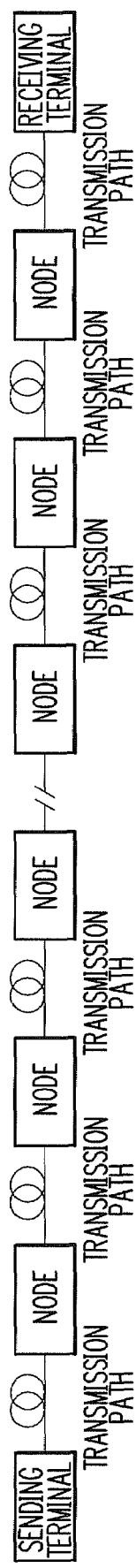
(b) RING CONFIGURATION
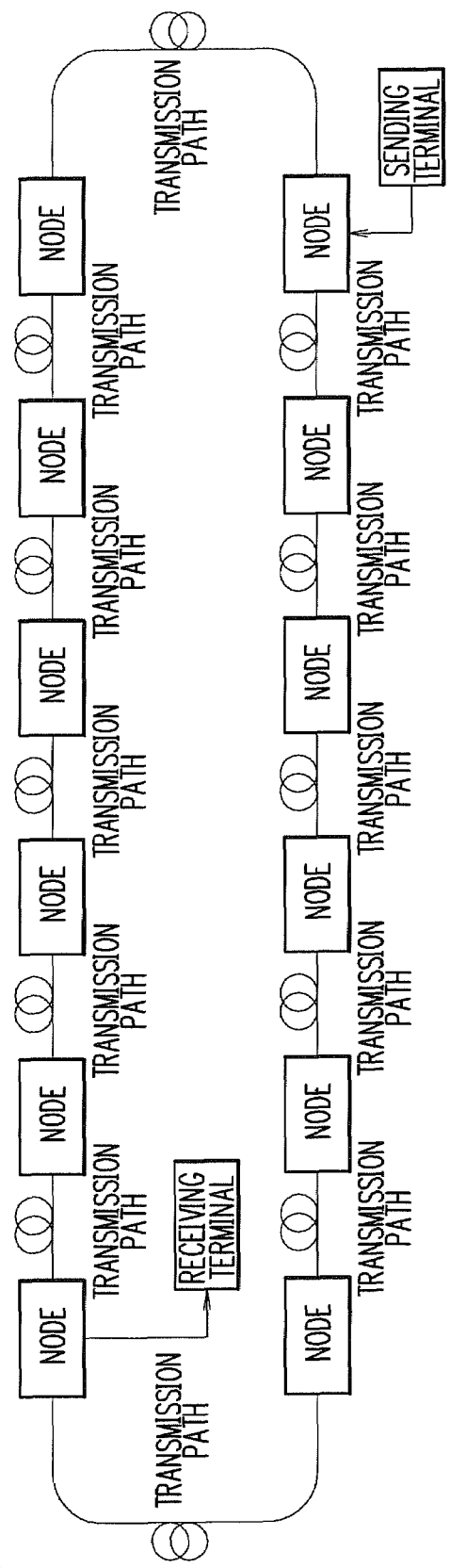

F I G. 6

```
If NFF=1                          ; WHEN GOING INTO DEAD ZONE AT TIME PREVIOUS DETECTION
then
    if abs(P0-P1)>=TH2 then       ; WHEN DIFFERENCE BETWEEN TARGET VALUE AND DETECTED VALUE EXCEEDS THRESHOLD VALUE OF CONTROL RESUMPTION
        P2=G(P0-P1)               ; RESTART FEEDBACK (G: GAIN < 1)
        A0(NEW)=A0(OLD)-P2        ; SETS WORKING QUANTITY
        NFF=0                     ; STATUS SHIFT FLAG = 0 (INDICATING COME OUT OF DEAD ZONE)
    else                          ; WHEN DIFFERENCE BETWEEN TARGET VALUE AND DETECTED VALUE IS SMALLER THAN THRESHOLD VALUE OF CONTROL RESUMPTION
        P2=0                      ; FEEDBACK GAIN = 0(OPERATION STOP)
        A0(NEW)=A0(OLD)-P2        ; WORKING QUANTITY HOLDS PREVIOUS VALUE
    endif
else                              ; WHEN COMING OUT OF DEAD ZONE AT TIME PREVIOUS DETECTION
    If abs(P0-P1)<=TH1 then       ; WHEN DIFFERENCE BETWEEN TARGET VALUE AND DETECTED VALUE IS WITHIN THRESHOLD VALUE OF CONTROL STOP
        P2=0                      ; FEEDBACK GAIN = 0 (OPERATION STOP)
        A0(NEW)=A0(OLD)-P2        ; WORKING QUANTITY HOLDS PREVIOUS VALUE
        NFF=1                     ; STATUS SHIFT FLAG = 1 (INDICATING COME IN DEAD ZONE)
    else
        P2=G(P0-P1)               ; FEEDBACK RESUMPTION (G: GAIN < 1)
        A0(NEW)=A0(OLD)-P2        ; SETS WORKING QUANTITY
    endif
endif
```

F I G. 10
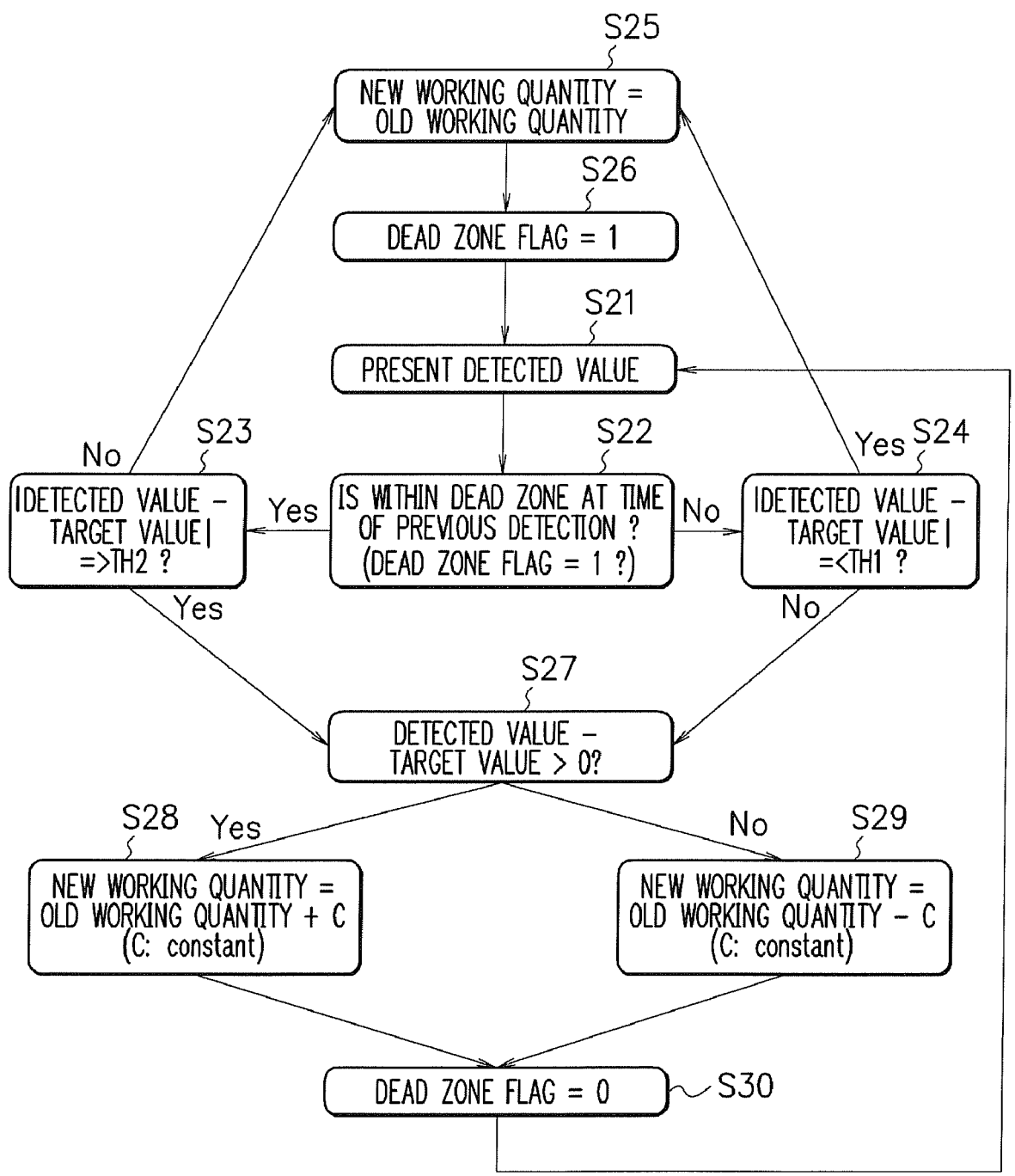

FIG. 11

```
If NFF=1                    ; WHEN GOING INTO DEAD ZONE AT TIME PREVIOUS DETECTION
then
    if abs(P0-P1)>=TH2 then ; WHEN DIFFERENCE BETWEEN TARGET VALUE AND DETECTED VALUE EXCEEDS THRESHOLD VALUE OF CONTROL RESUMPTION
        if(P0-P1)<=0 then   ; WHEN DETECTED VALUE IS LARGER THAN TARGET VALUE
            P2=-C           ; PERFORMS FEEDBACK SO AS TO REDUCE DETECTED VALUE
            else P2=C       ; WHEN DETECTED VALUE IS SMALLER THAN TARGET VALUE, PERFORMS FEEDBACK SO AS TO RAISE DETECTED VALUE
        endif AO(NEW)=AO(OLD)-P2  ; SETS WORKING QUANTITY
        NFF=0               ; STATUS SHIFT FLAG = 0 (INDICATING COME OUT OF DEAD ZONE)
    else                    ; WHEN DIFFERENCE BETWEEN TARGET VALUE AND DETECTED VALUE IS SMALLER THAN THRESHOLD VALUE OF CONTROL RESUMPTION P2=0                ; FEEDBACK GAIN = 0(OPERATION STOP)
        AO(NEW)=AO(OLD)-P2  ; WORKING QUANTITY HOLDS PREVIOUS VALUE
    endif else                        ; WHEN COMING OUT OF DEAD ZONE AT TIME PREVIOUS DETECTION
    If abs(P0-P1)<=TH1 then ; WHEN DIFFERENCE BETWEEN TARGET VALUE AND DETECTED VALUE IS WITHIN THRESHOLD VALUE OF CONTROL STOP
        P2=0                ; FEEDBACK GAIN = 0 (OPERATION STOP)
        AO(NEW)=AO(OLD)-P2  ; WORKING QUANTITY HOLDS PREVIOUS VALUE
        NFF=1               ; STATUS SHIFT FLAG = 1 (INDICATING COME IN DEAD ZONE)
    else
        if abs(P0-P1)<=0 then ; WHEN DETECTED VALUE IS LARGER THAN TARGET VALUE
            P2=-C           ; PERFORMS FEEDBACK SO AS TO REDUCE DETECTED VALUE
            else P2=C       ; WHEN DETECTED VALUE IS SMALLER THAN TARGET VALUE, PERFORMS FEEDBACK SO AS TO RAISE DETECTED VALUE
        endif AO(NEW)=AO(OLD)-P2  ; SETS WORKING QUANTITY
    endif
endif
```

F I G. 13
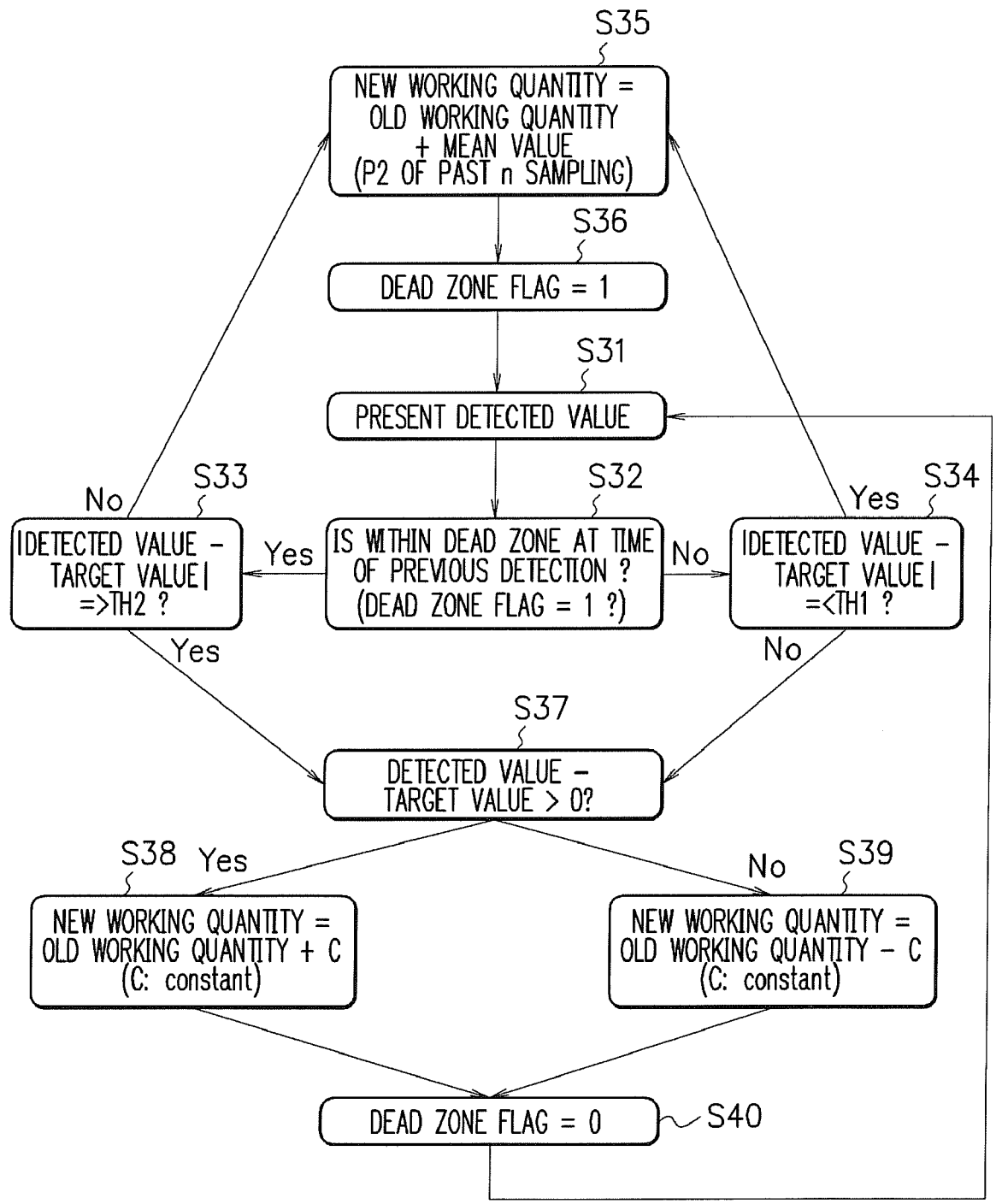

OPTICAL FEEDBACK CONTROL UNIT, OPTICAL COMMUNICATION SYSTEM, FEEDBACK CONTROL METHOD, AND RECORDING MEDIUM FOR RECORDING PROGRAM

This application is based upon and claims the benefit of priority from Japanese paten application No. 2007-059795, filed on Mar. 9, 2007, the disclosure of which is incorporated herein in its entirety by reference.

BACKGROUND OF THE INVENTION

1. Field of the Invention

The present invention relates to an optical feedback control unit for determining an optical output by a feedback control, an optical communication system, a feedback control method, and a recording medium for recording a program.

2. Description of Related Art

In recent years, a transmission technology such as a metropolitan WDM (wavelength division multiplexing) has been come into practical use, and an optical direct amplified transmission has been popularized in multiple node links. Generally, for example, an optical add/drop apparatus, a gain-deviation compensation apparatus (optical equalizer), and a wavelength cross-connect apparatus, etc. are disposed in each node, thereby performing a feedback control such that an optical output of each node is constant.

This feedback control is to compensate an optical level when changing a setting of the optical add/drop or the loss increase of parts over a long-term (several months or several years) span and the loss change of a transmission path when transferring obstruction.

The feedback period is regulated by a response and operation time of devices such as a wavelength blocker, a wavelength selection switch, and an optical channel monitor, or the like that are used in the above-mentioned apparatuses, the feedback period being about several hundreds ms to about several s. In addition, as the feedback control, there is a digital feedback that feedbacks quantity provided by a prescribed calculation in each prescribed period.

Furthermore, as an optical communication system related to the technology of the present invention, OADM (optical add/drop multiplexer) node that monitors a power level by branching off an inserted optical signal in an output unit of an optical amplifier to hold an optical output per channel of the inserted optical signal at a predetermined value being equalized to the optical output per channel of another optical signal is used (for example, see Japanese Patent Application Laid-Open (JP-A) No. 2002-185407).

Furthermore, as the related art performing the feedback control, a continuously variable transmission stopping the feedback control sets a width of a dead zone during transmission to be smaller than that of the dead zone during non-transmission when a deviation between a target transmission ratio or a target rotation number and an actual transmission ratio or an actual input rotation number is within a prescribed dead zone (for example, see JP-A No. 2004-116537).

Hereinafter, the problems of each of the related arts will be described.

First, since the above-described feedback period is the comparable order as the period of an optical level change due to the loss of the transmission path and the polarized variation, unnecessary response behavior is sometimes shown so that it may become one factor making the system unstable.

FIG. 1 illustrates representative variable elements to be occurred in the optical communication system and variation span and variation quantity due to the variable elements. As illustrated in FIG. 1, the variation spans become short by means of the variable elements such as a setting modification of a breakdown or add/drop, but the variation span becomes long in a part degradation or season variation. Preferably, among the variable elements, the feedback control does not respond to the optical level due to the polarized variation or the loss variation but reliably can respond to the other variable elements.

Here, for example, when the feedback period is sufficiently (for example, more than ten times) longer than the variation period of the optical level due to the polarized variation or the loss variation, it can make no response to the optical level change due to the polarized variation or the loss variation. However, in this case, there is a problem that the response with respect to the optical level change which is to be quickly compensated, such as the optical level compensation, etc., during the breakdown or the setting modification is also delayed.

In addition, according to JP-A No. 2002-185407, the optical output per the channel of one optical signal is equalized to the optical output per the channel of another optical signal by the feedback control. Accordingly, there is no consideration to perform the stable feedback control without being affected by the optical level change due to the polarized variation or the loss variation.

Furthermore, according to JP-A No. 2004-116537, there is no consideration about the application to the optical signal and the width of the dead zone is only changed from the feedback control by the operation mode during the transmission or non-transmission so that there is no consideration to perform the stable feedback control in the system to which plural nodes are connected.

That is, in a case where the feedback control is performed in the optical communication system to which the plural nodes are connected, for example, when the fluctuation of the optical signal from the sending terminal occurs in the system configuration illustrated in FIG. 2, the feedback control is asynchronously initiated in each node so as to compensate the fluctuation. Since variable elements increase with forwarding downstream nodes, the stabilization is progressed in the order from an upstream node close to the sending terminal.

Here, the dead zone is uniformly installed irrespective of whether the system is the stabilized status or the fluctuation state as well as even in the state where the fluctuation occurs in the upstream, the feedback control is continuously performed until the width of the dead zone in the state where the system is stabilized.

In the upstream node, when the feedback control is performed until the dead zone in the state where the system is stabilized, the upstream node is stabilized, but there is a risk of increasing the variable elements in the downstream node. Therefore, it takes much time until the overall system is stabilized.

As described above, according to the feedback control of JP-A No. 2004-116537, there is no consideration to make the unstable system stabilize by the proper feedback control without being affected by the optical level change due to the polarized variation or the loss variation in the optical communication system to which the plural nodes are connected.

SUMMARY OF THE INVENTION

The present invention is contrived to solve the above-mentioned problems. Accordingly, it is an object of the present invention to provide an optical feedback control unit, an optical communication system, a feedback control method, and a recording medium for recording a program capable of making an unstable system stable by a proper feedback control without being affected by an optical level change due to a polarized variation or a loss variation even when used in the optical communication system to which a plurality of nodes are connected and capable of performing stable operation even in an environment where a variety of variable elements exist.

In order to achieve the object, the optical feedback control unit according to present invention includes detection means and optical output control means determining an optical output by a feedback control using a result detected from the detection means, wherein a dead zone not performing the feedback control is set with respect to a difference between a detected value from the detection means and a control target value, and a width of the dead zone when the difference between the detected value and the control target value is within the dead zone, is set to be wider than that of the dead zone when the difference between the detected value and the control target value is out of the dead zone.

In addition, an optical communication system according to the present invention is configured such that a plurality of optical transmission apparatuses including the optical feedback control unit described above are connected in a cascade through an optical transmission path between an optical sending apparatus and an optical receiving apparatus.

Furthermore, a feedback control method according to the present invention includes: a detecting step to detect an optical level output and an optical output controlling step to determine an optical output by feedback control using results detected from the detecting step, wherein a dead zone not performing the feedback control is set for a difference between a detected value from the detecting step and a control target value, and a width of the dead zone when the difference between the detected value and the control target value is within the dead zone, is set to be wider than that of the dead zone when the difference between the detected value and the control target value is out of the dead zone.

In addition, a recording medium recording a feedback control program that executes a detection process to detect an optical level output and an optical output control process to determine an optical output by a feedback control using a result detected from the detection process in a computer, wherein a dead zone not performing the feedback control is set for a difference between a detected value from the detection process and a control target value, and a width of the dead zone when the difference between the detected value and the control target value is within the dead zone, is set to be wider than that of the dead zone when the difference between the detected value and the control target value is out of the dead zone.

BRIEF DESCRIPTION OF THE DRAWINGS

FIG. 1 is a view illustrating a relation of a typical variable element and a variation span and so on that can occur in an optical communication system;

FIG. 3 is a block diagram illustrating a configuration example of the optical communication system according to an exemplary embodiment of the present invention;

FIG. 6 is a view illustrating an example of a source code of the feedback control;

FIG. 10 is a flowchart illustrating a feedback control according to a third exemplary embodiment of the present invention;

FIG. 11 is a view illustrating an example of a source code of the feedback control according to the third exemplary embodiment of the present invention;

FIG. 13 is a flowchart illustrating a feedback control according to a fourth exemplary embodiment of the present invention.

EXEMPLARY EMBODIMENT

A first exemplary embodiment of an optical feedback control unit, an optical communication system, a feedback control method, and a recording medium for recording a program according to the present invention will be described in more detail with reference to the accompanying drawings.

First, a first exemplary embodiment of the present invention will be briefly described.

The first exemplary embodiment of the present invention provides an optical direct amplified transmission apparatus including means for performing a feedback control, wherein a feedback period (time constant) is the order of about several hundreds ms to about several s and each node (optical transmission apparatuses) connected thereto in a cascade is used. The optical direct amplified transmission apparatus is stabilized with respect to polarized variation and a loss variation of a transmission path with vibration period of the same order as the above-mentioned time constant without increasing the time constant.

For this reason, in the first exemplary embodiment of the present invention, the following processes are used as a feedback control in each node;

setting a gain (changed step amount) to be one time or less (smaller than a difference between a target value and a present measurement value) by performing a feedback once, setting dead zone for stopping a feedback operation, when the measurement value reaches the vicinity of the target value, holding hysteresis in a dead zone threshold value for stopping the feedback control and a dead zone threshold value for restarting the feedback control, and setting the dead zone threshold value for stopping the feedback control so as to be narrower than the dead zone threshold value for restarting the feedback control.

The optical communication system according to the first exemplary embodiment of the present invention will be described.

Figure 2:
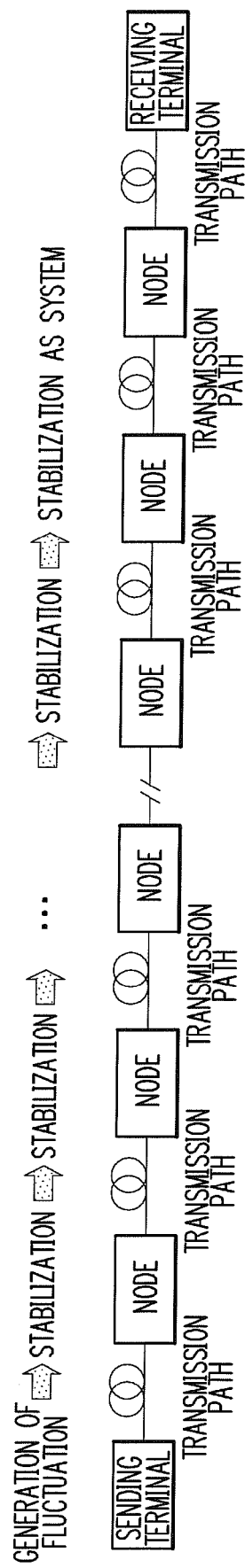
FIG. 2 is a view illustrating stabilization operation by a feedback control in the optical communication system to which plural nodes are connected.
Figure 4:
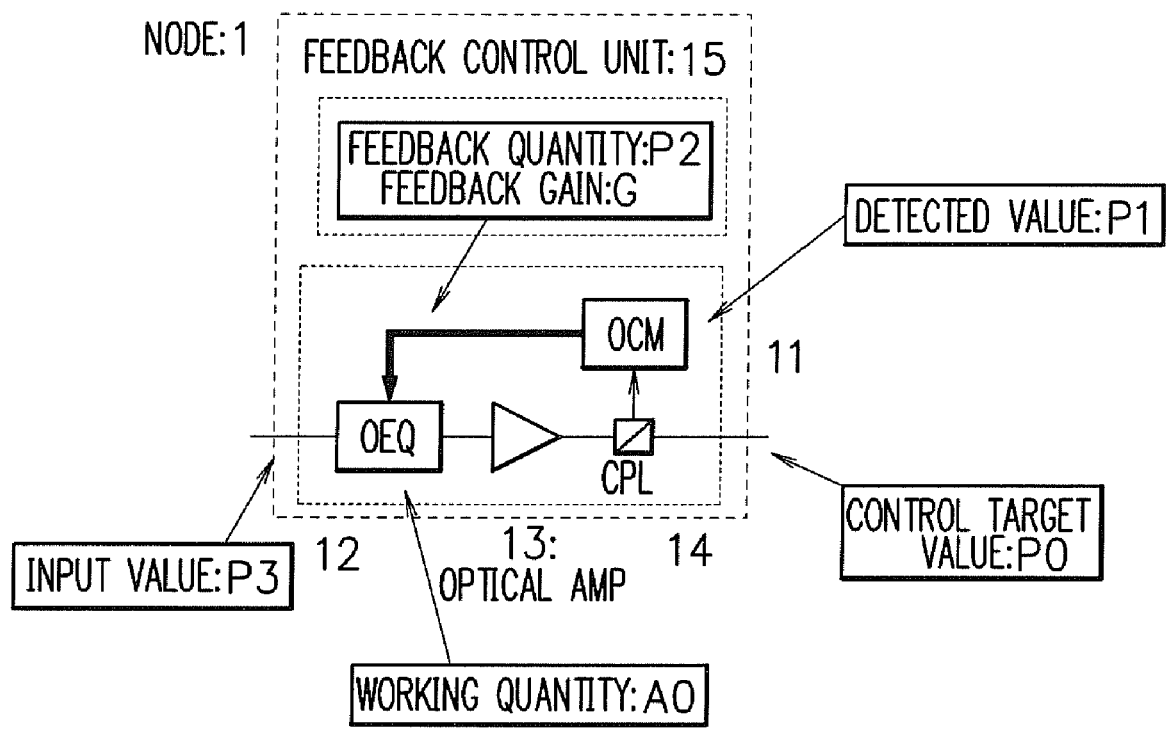
FIG. 4 is a block diagram illustrating a configuration example of an optical transmission apparatus according to the exemplary embodiment of the present invention.
Figure 5:
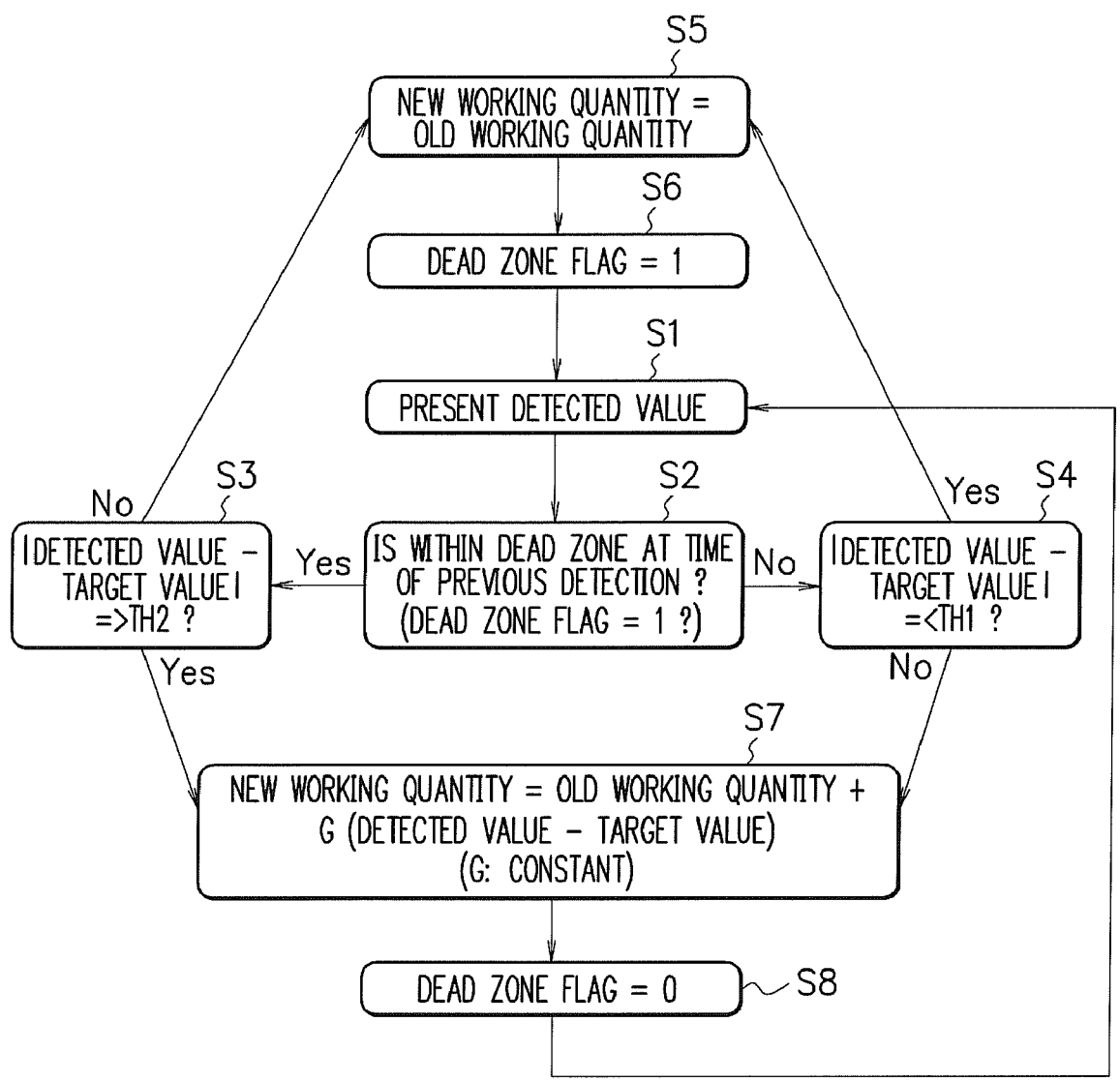
FIG. 5 is a flowchart illustrating a feedback control according to a first exemplary embodiment of the present invention.

FIG. 3 illustrates an example of the system to which the present invention is applied; FIG. 4 illustrates a configuration example of the optical transmission apparatus according to the first exemplary embodiment of the present invention; FIG. 5 illustrates an operation outline; and FIG. 6 illustrates a control sequence in detail.

FIG. 3 is an example of the optical communication system according to the present invention.

The optical communication system of FIG. 3 is configured such that optical signals from a sending terminal is input to the nodes through a transmission path, wherein a sending terminal and a receiving terminal are connected in a cascade. Furthermore, FIG. 3(a) illustrates a linear configuration and FIG. 3(b) illustrates a ring configuration.

In the optical communication system of the first exemplary embodiment, a plurality of optical add/drop apparatuses (optical transmission apparatuses) called nodes, a plurality of gain-deviation compensation apparatuses (optical equalizer), and a plurality of wavelength cross-connect apparatuses are disposed in one optical transmission path. Furthermore, the optical communication system of the first exemplary embodiment is the optical direct amplified transmission system that does not perform a regenerative relay (3R relay) between the sending terminal and the receiving terminal.

Devices such as a wavelength blocker, a wavelength selection switch, and an optical channel monitor, etc. are mounted on the nodes, and the optical feedback is performed on the node output. This feedback period is several hundreds ms to several s.

Meanwhile, a state of the transmission path is not always stable. Particularly, when the optical feedback transmission path is an overhead earth-wire, the polarized surface or the loss is always changed in an optical fiber by the vibration due to a wind, etc. This period is the order of several hundreds ms to several s from experience.

FIG. 4 is a view illustrating an inner configuration of a node (optical transmission apparatus) 1 that is used in the optical communication system of FIG. 3. Each node 1 is provided with an optical feedback control unit including level variable means (OEQ; optical equalizer) 12, an optical AMP (AMP; amplifier) 13, optical branch means (CPL; coupler) 14, level detection means (OCM; optical channel monitor) 11, and a feedback control portion 15.

The feedback control unit 15 is fulfilled by a computer and software, thereby controlling the operation by the optical feedback control unit.

Referring to FIG. 4, the outline of the feedback operation will be described.

A portion of node outputs is branched by CPL 14 and is wave-guided into the OCM 11. A level P1 of the node output is detected in the OCM 11.

The feedback control unit 15 compares the measurement value P1 with a control target value P0, then calculates a necessary feedback quantity P2 and notifies the OEQ 12 of the necessary feedback quantity. At this time, the gain G of the feedback is 1 or less.

The OEQ 12 calculates a new working quantity (A0 [NEW]), which will be newly set, from a present working quantity (A0 [OLD]) and the feedback quantity (P2), thereby resets the working quantity (attenuation quantity of OEQ 12).

According to the feedback system of the first exemplary embodiment of the present invention, the feedback control unit 15 and the OEQ 12 function as optical output control means, which controls the feedback by using the detection results of the OCM 1, and repeat the afore-mentioned a series of operations with the period of several hundreds ms to several s.

FIG. 5 is a flowchart illustrating the operation by the feedback control according to the first exemplary embodiment of the present invention.

FIG. 6 is a view illustrating an example of a source code for performing the feedback control. In FIG. 6, TH1 represents the dead zone threshold value that stops the feedback control. TH2 represents the dead zone threshold value that restarts the feedback control. Character 'G' represents the gain.

As to the difference (P0–P1) between the detected value P1 and the control target value P0, the value of status shift flag (dead zone flag) NFF is set as follows:

The status where the difference (P0–P1) is within the dead zone: NFF=1;

The status where the difference (P0–P1) is out of the dead zone: NFF=0. The initial value is "NFF=0".

Figure 7:
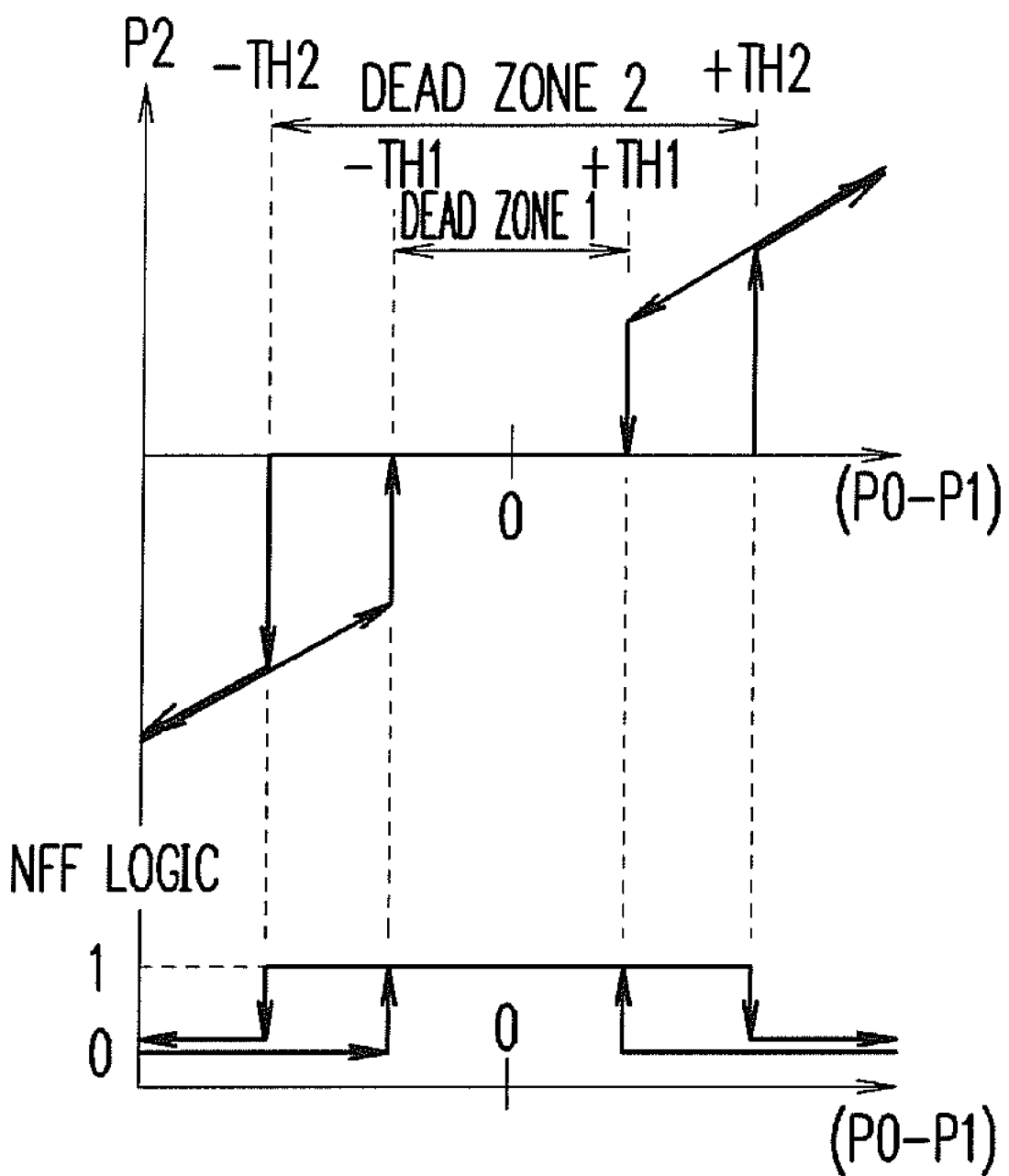
FIG. 7 is a view illustrating an operation outline of the feedback control according to the first exemplary embodiment of the present invention.

FIG. 7 illustrates the operation according to the feedback control illustrated in FIG. 5 and FIG. 6 as a polygonal line graph. A horizontal axis represents a result of comparison (P0–P1), and a vertical axis represents a feedback quantity P2 and a status of the status shift flag NFF. An arrow in the graph represents a changing direction of (P0–P1).

Referring to FIG. 5 to FIG. 7, the feedback control according to the first exemplary embodiment will be described in detail.

First, if OCM 11 detects level P1 of the node output at the time of measurement (step S1), the detected value P1 is sent to a feedback control unit 15. When the status shift flag is NFF=1 at the time of previous detection (step S2; Yes) and the difference |P0–P1| between the sent detected value P1 and a control target value P0 is smaller than TH2 (step S3; No), the feedback control unit 15 does not change old working quantity so far into a new working quantity calculated by OEQ 12(step S5) and keeps up the status shift flag NFF=1 (step S6).

Furthermore, When the status shift flag is NFF=0 at the time of previous detection (step S2; No) and the difference |P0–P1| between the sent detected value P1 and a control target value P0 is smaller than TH1 (step S4; Yes), the feedback control unit 15 does not change old working quantity so far into a new working quantity calculated by OEQ 12(step S5) and changes the status shift flag into NFF=1 (step S6).

Furthermore, When the status shift flag is NFF=1 at the time of previous detection (step S2; Yes) and the difference |P0–P1| between the sent detected value P1 and a control target value P0 is larger than TH2 (step S3; Yes), the feedback control unit 15 determines the new working quantity according to OEQ 12 such that the feedback quantity becomes larger in response to |P0–P1| and restarts the feedback control (step S7). The status shift flag is changed to NFF=0 (step S8).

Furthermore, When the status shift flag is NFF=0 at the time of previous detection (step S2; No) and the difference |P0–P1| between the sent detected value P1 and a control target value P0 is larger than TH1 (step S4; No), the feedback control unit 15 continues the feedback control that determines the new working quantity according to OEQ 12 such that the feedback quantity becomes larger in response to |P0–P1|(step S7). The status shift flag NFF=0 remains unchanged (step S8).

The feedback system according to the first exemplary embodiment of the present invention repeatedly performs the above-mentioned a series of operations with the period of several hundreds ms to several s so that even when it stabilizes nodes sequentially from the upstream node close to the sending terminal, the unstable system may be stabilized by a proper feedback control without being affected by the optical level change due to the polarized variation or the loss variation.

A setting method of TH1, TH2, and G will be described.

First, the value of |G| needs to be set to one time or less. The smaller the value of G, the more the system is stabilized. However, it takes more time to stabilize the system.

Second, as for the value of |TH1|, it is preferable to set to at least a half times or, if possible, more than double, as compared to the minimum value of the feedback quantity |P2|=|G (P0−P1)|. When the value of |TH1| is a half times or less, the system oscillates. In other words, it is necessary that P2 is set so as to be smaller than the threshold value TH1, which shifts into the control stopped status. When P2 is set to more value than TH1, the gain becomes more than one time. Accordingly, the system oscillates.

Third, it is necessary that the value of |TH1| is set to the value more than the level change quantity due to the variable element intended to be removed from an object that responds to the feedback control that is the polarized variation or the loss variation within the node. The smaller this value, the more the control performance is improved.

Fourth, it is necessary to set the value of |TH2| so as to be a maximum of one time or less as compared to the control error quantity that is tolerated as a standard of the system. That is, since the system is designed to satisfy a specification specified in the prescribed standard, it is necessary to set the value of |TH2| so as not to break the standard.

Fifth, it is necessary to set the value of |TH1| so as to be less than |TH2|.

As described above, when the measurement value becomes close to the target value, the width (|TH1|×2) of the dead zone in the case where the difference between the detected value and the control target value changes in the direction of going into the dead zone is set so as to be narrower than that (|TH2|×2) of dead zone in the case where the difference changes in the direction of coming out of the dead zone.

In addition, as described above, even in the optical communication system to which the plural nodes are connected, the system is sequentially stabilized from the upstream node to the downstream node without increasing the variable elements in the downstream node by holding the hysteresis in the dead zone threshold value for stopping the feedback control and the dead zone threshold value for restarting the feedback control so that the overall system may be stabilized more promptly and reliably.

The example of the source code for this feedback control is illustrated in FIG. 6. As illustrated in FIG. 6, in the case where the difference between the detected value P1 and the control target value P0 is within the dead zone, the width of the dead zone is largely set as compared to the case where the difference between the detected value P1 and the control target value P0 is out of the dead zone.

As described above, according to the first exemplary embodiment of the present invention, following effects can be obtained.

First, the oscillation in the system is suppressed. The reason is because the feedback gain of each node becomes one time or less.

Second, the unstable behavior in the system is improved. The reason is because the feedback operation is not performed on the behavior with respect to the level change occurred in the transmission path, by holding the dead zone and the hysteresis therein.

Third, the degradation of response speed is suppressed. The reason is because the time constant of the feedback is not changed by using the dead zone so as to stabilize the system.

As described above, by setting |TH1| less than |TH2| as a threshold value and holding the hysteresis, the feedback control can be performed so as not to respond to the normal variation such as the polarized variation within the allowable level, while the feedback control can be performed so as to promptly correspond to the optical level change such as the breakdown, the setting modification, and the loss increase of the transmission path fiber which will be promptly compensated.

For this reason, for example, even in the use for the optical communication system to which the plural nodes are connected, it may be possible to sequentially stabilize the unstable system from the upstream node by the stable feedback control in the optical communication without being affected by the optical variation due to the polarized variation or the loss variation.

Second Exemplary Embodiment

Next, the second exemplary embodiment of the present invention will be described.

Instead of setting a feedback quantity |P2|=0 in a case where (P0−P1) is within the dead zone in the above-mentioned first exemplary embodiment, the second exemplary embodiment is to perform an integral control which makes a quantity larger by only the mean value of the predetermined number of times of feedback quantity. The same description in the first exemplary embodiment will be omitted.

Figure 8:
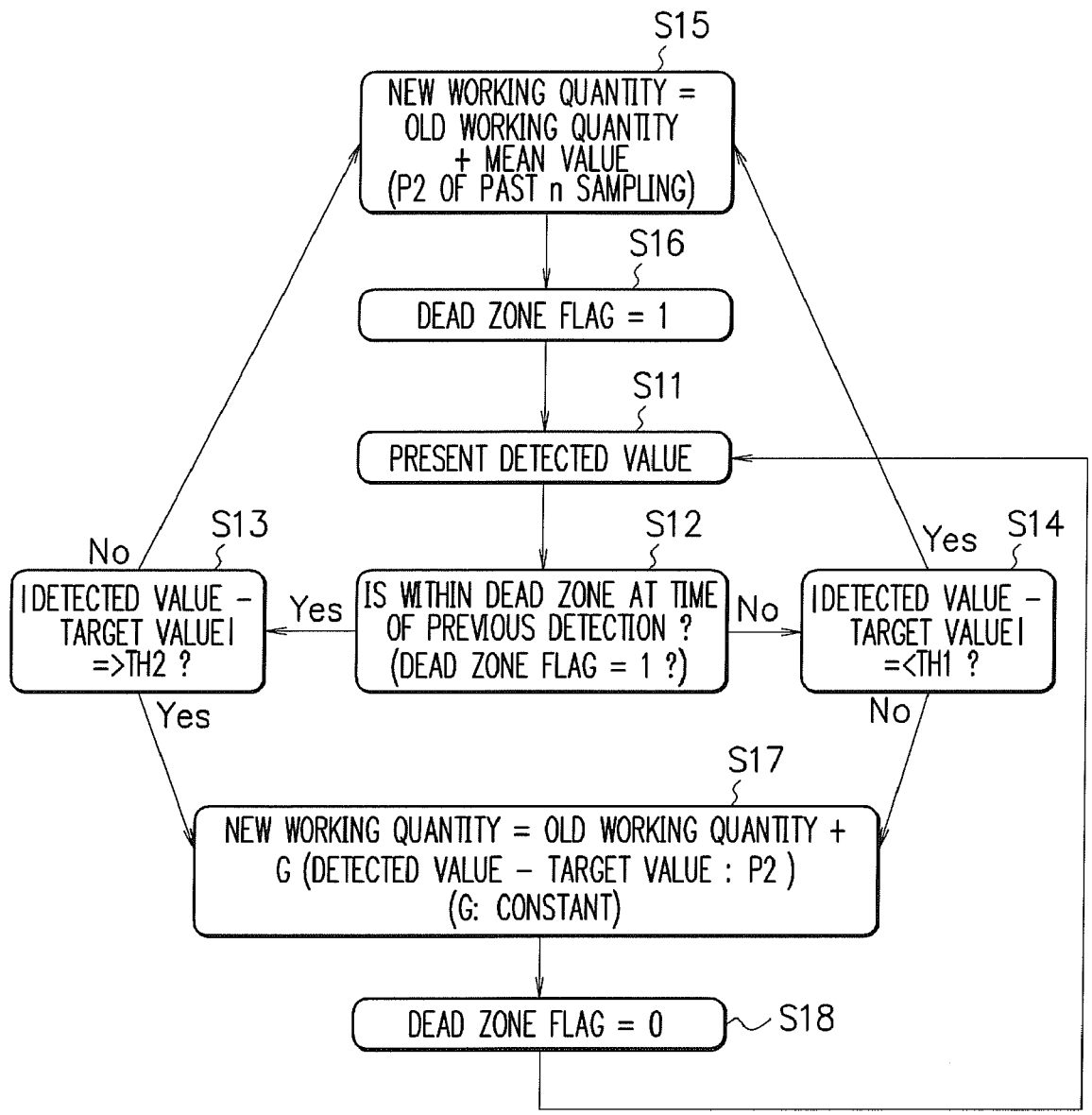
FIG. 8 is a flowchart illustrating a feedback control according to a second exemplary embodiment of the present invention.

FIG. 8 is a flowchart illustrating an operation according to the feedback control of the second exemplary embodiment.

Figure 9:
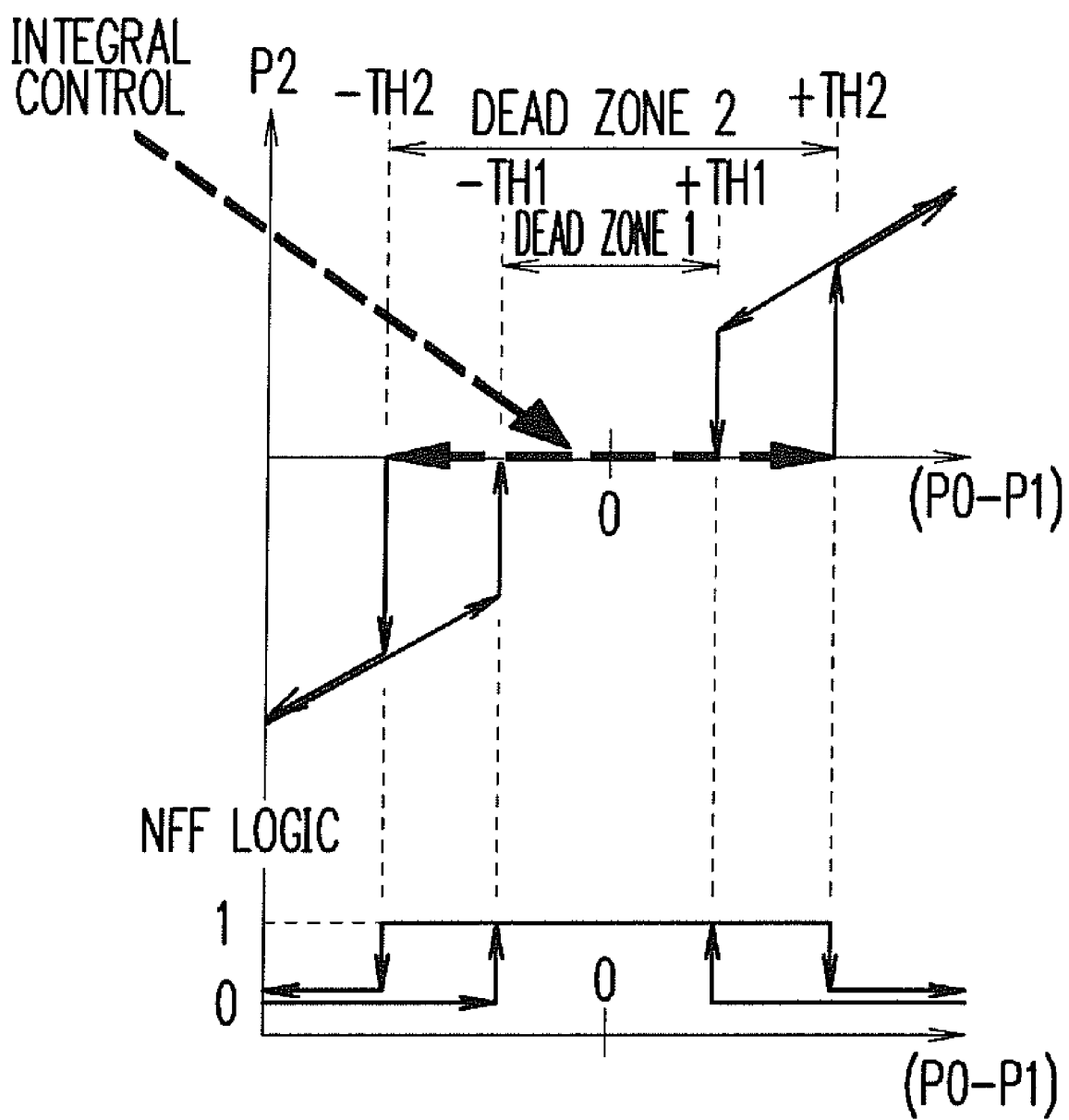
FIG. 9 is a view illustrating an operation outline of the feedback control according to the second exemplary embodiment of the present invention.

FIG. 9 illustrates the operation according to the feedback control illustrated in FIG. 8 as a polygonal line graph. A horizontal axis represents a result of comparison (P0−P1), and a vertical axis represents a feedback quantity P2 and a status of a status shift flag NFF. A solid line arrow in the graph represents a changing direction of (P0−P1). A thick dotted arrow represents a portion of integral control.

Referring to FIG. 8 and FIG. 9, the feedback control according to the second exemplary embodiment will be described in detail.

First, if OCM 11 detects a level P1 of the node output at the time of measurement (step S11), the detected value P1 is sent to a feedback control unit 15. When the status shift flag is NFF=1 at the time of previous detection (step S12; Yes) and the difference |P0−P1| between the sent detected value P1 and a control target value P0 is smaller than TH2 (step S13; No), the feedback control unit 15 sets the value which adds the mean value of the predetermined number of times of feedback quantity P2 to the old working quantity so far according to OEQ 12 as a new working quantity according to OEQ 12 (step S15). The status shift flag NFF=1 remains unchanged (step S16).

Furthermore, when the status shift flag is NFF=0 at the time of previous detection (step S12; No) and the difference |P0−P1| between the sent detected value P1 and a control target value P0 is smaller than TH1 (step S14; Yes), the feedback control unit 15 sets the value which adds the mean value of the predetermined number of times of feedback quantity P2 to the old working quantity so far according to OEQ 12 as a new working quantity according to OEQ 12 (step S15). In addition, the status shift flag is changed to NFF=1 (step S16).

Furthermore, when the status shift flag is NFF=1 at the time of previous detection (step S12; Yes) and the difference |P0−P1| between the sent detected value P1 and a control target value P0 is larger than TH2 (step S13; Yes), the feedback control unit 15 determines the new working quantity according to OEQ 12 such that the feedback quantity becomes larger in response to |P0−P1| and restarts the feedback control (step S17). The status shift flag is changed to NFF=0 (step S18).

Furthermore, when the status shift flag is NFF=0 at the time of previous detection (step S12; No) and the difference |P0−P1| between the sent detected value P1 and a control target value P0 is larger than TH1 (step S14; No), the feedback control unit 15 continues the feedback control that determines the new working quantity according to OEQ 12 such that the feedback quantity becomes larger in response to |P0−P1| (step S17). The status shift flag NFF=0 remains unchanged (step S18).

As described above, according to the second exemplary embodiment of the present invention, the effect is the same as in the first exemplary embodiment described above. Furthermore, since the integral control that adds the mean value of the predetermined number of times of feedback quantity P2 is performed, even when (P0−P1) is within the dead zone, an optical output according to the node, that is, a detected value P1 is approximated toward the control target value more quickly.

Third Exemplary Embodiment

Next, the third exemplary embodiment of the present invention will be described.

Instead of changing a feedback quantity |P2| in response to |P0−P1| in the first exemplary embodiment described above, the third exemplary embodiment controls to keep the feedback quantity |P2| constant.

As illustrated in FIG. 3, in a optical communication system where a plurality of nodes are connected in a cascade, a level change in the upstream node passes through the downstream nodes so that the level change in the downstream node becomes the sum total of the control quantity of the upstream node.

Therefore, in case that the large numbers of nodes are connected in the cascade, if the feedback quantity is set as a large value, the level change quantity in the downstream node may exceed the allowable level. The third exemplary embodiment makes the system stable by a proper feedback control even in case of a multi stage connection.

By using the third exemplary embodiment, the gain becomes small when (P0−P1) is large, that is, the difference between the detected value and the target value is large. In addition, the gain becomes large when the difference is small. The same description in the first exemplary embodiment will be omitted.

FIG. 10 is a flowchart illustrating an operation by the feedback control according to the third exemplary embodiment.

FIG. 11 is an exemplary source code for performing the feedback control.

Figure 12:
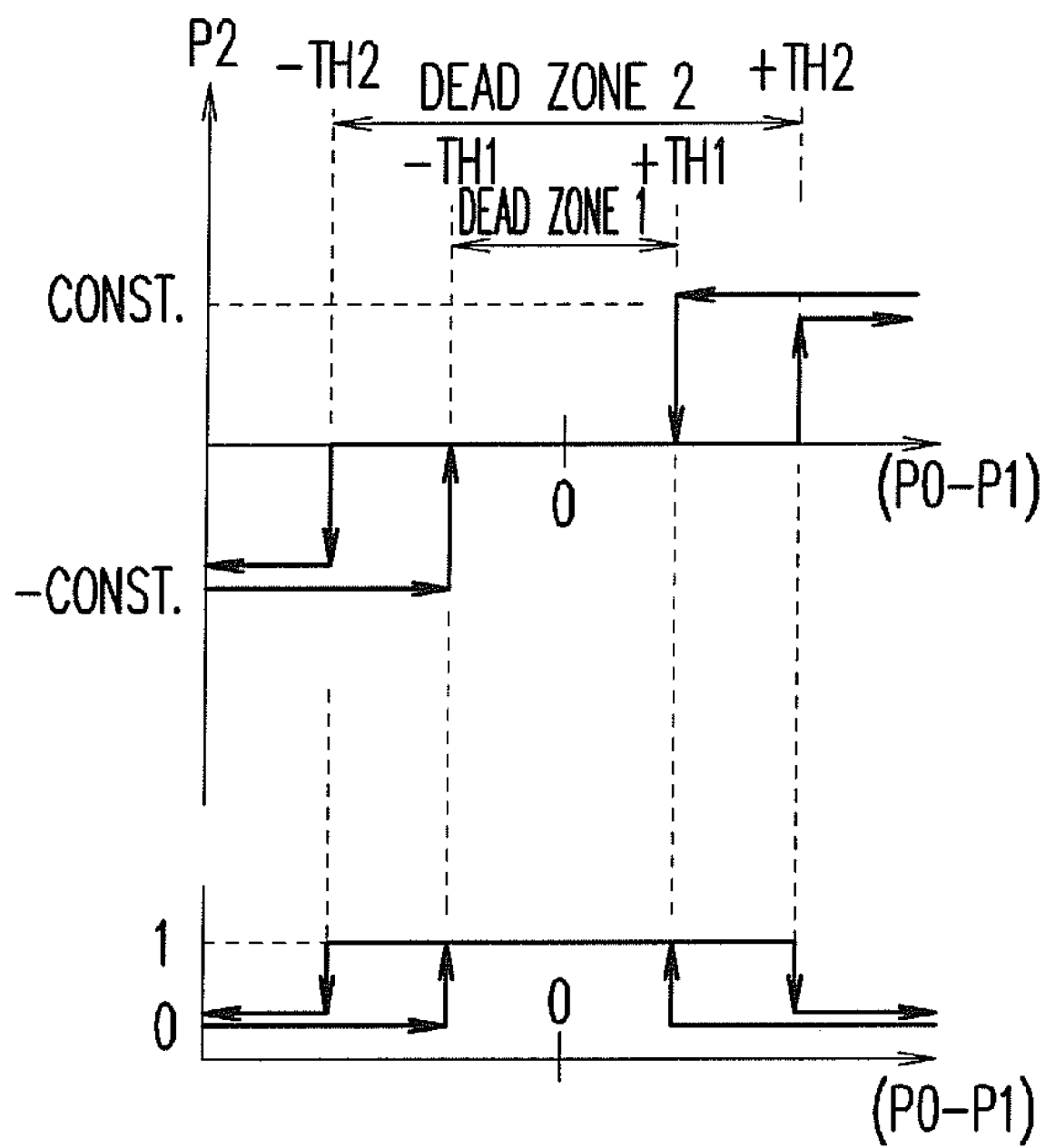
FIG. 12 is a view illustrating an operation outline of the feedback control according to the third exemplary embodiment of the present invention.

FIG. 12 illustrates the operation by the feedback control illustrated in FIG. 10 and FIG. 11 as a polygonal line graph. A horizontal axis represents the result of the comparison (P0−P1), and a vertical axis represents a feedback quantity P2 and a status shift flag NFF status. An arrow line in the graph represents a changing direction of (P0−P1).

Referring to FIG. 10 to FIG. 12, the feedback control according to the present embodiment will be described in detail.

First, if OCM 11 detects level P1 of the node output at the time of measurement (step S21), the detected value P1 is sent to a feedback control unit 15. When the status shift flag is NFF=1 at the time of previous detection (step S22; Yes) and the difference |P0−P1| between the sent detected value P1 and a control target value P0 is smaller than TH2 (step S23; No), the feedback control unit 15 does not change the old working quantity so far into a new working quantity according to OEQ 12(step S25) and keeps up the status shift flag NFF=1 (step S26).

Furthermore, when the status shift flag is NFF=0 at the time of previous detection (step S22; No) and the difference |P0−P1| between the sent detected value P1 and a control target value P0 is smaller than TH1 (step S24; Yes), the feedback control unit 15 does not change the old working quantity so far into a new working quantity according to OEQ 12 (step S25) and changes the status shift flag into NFF=1 (step S26).

Furthermore, when the status shift flag is NFF=1 at the time of previous detection (step S22; Yes) and the difference |P0−P1| between the sent detected value P1 and a control target value P0 is larger than TH2 (step S23; Yes), it determines whether the detected value is larger than the target value or not (step S27).

If the detected value is larger than the target value (step S27; Yes), the feedback control is restarted so that the detected value is reduced (step S28).

If the detected value is smaller than the target value (step S27; No), the feedback control is restarted so that the detected value is increased (step S29).

In either case of step S28 or step S29, a status shift flag is changed to NFF=0 (step S30).

Furthermore, when the status shift flag is NFF=0 at the time of previous detection (step S22; No) and the difference |P0−P1| between the sent detected value P1 and a control target value P0 is larger than TH1 (step S24; No), it determines whether the detected value is larger than the target value or not (step S27).

If the detected value is larger than the target value (step S27; Yes), the feedback control is performed so that the detected value is reduced (step S28).

If the detected value is smaller than the target value (step S27; No), the feedback control is performed so that the detected value is increased (step S29).

In either case of step S28 or step S29, a status shift flag NFF=0 remains unchanged (step S30).

As described above, according to the third exemplary embodiment of the present invention, since the effect is the same as in the first exemplary embodiment described above and the feedback quantity |P2| is controlled as being constant, even in case that a plurality of nodes is connected in the cascade, the allowable level for the downstream nodes is not to be exceeded and the system may become stable by the proper feedback control.

Fourth Exemplary Embodiment

Next, the fourth exemplary embodiment of the present invention will be described.

Instead of setting a feedback quantity |P2|=0 in a case where (P0−P1) is within the dead zone in the above-mentioned third exemplary embodiment, the fourth exemplary embodiment is to perform an integral control which makes a quantity larger by only the mean value of the predetermined number of times of feedback quantity. The same description in the third exemplary embodiment will be omitted.

FIG. 13 is a flowchart illustrating an operation according to the feedback control of the fourth exemplary embodiment.

Figure 14:
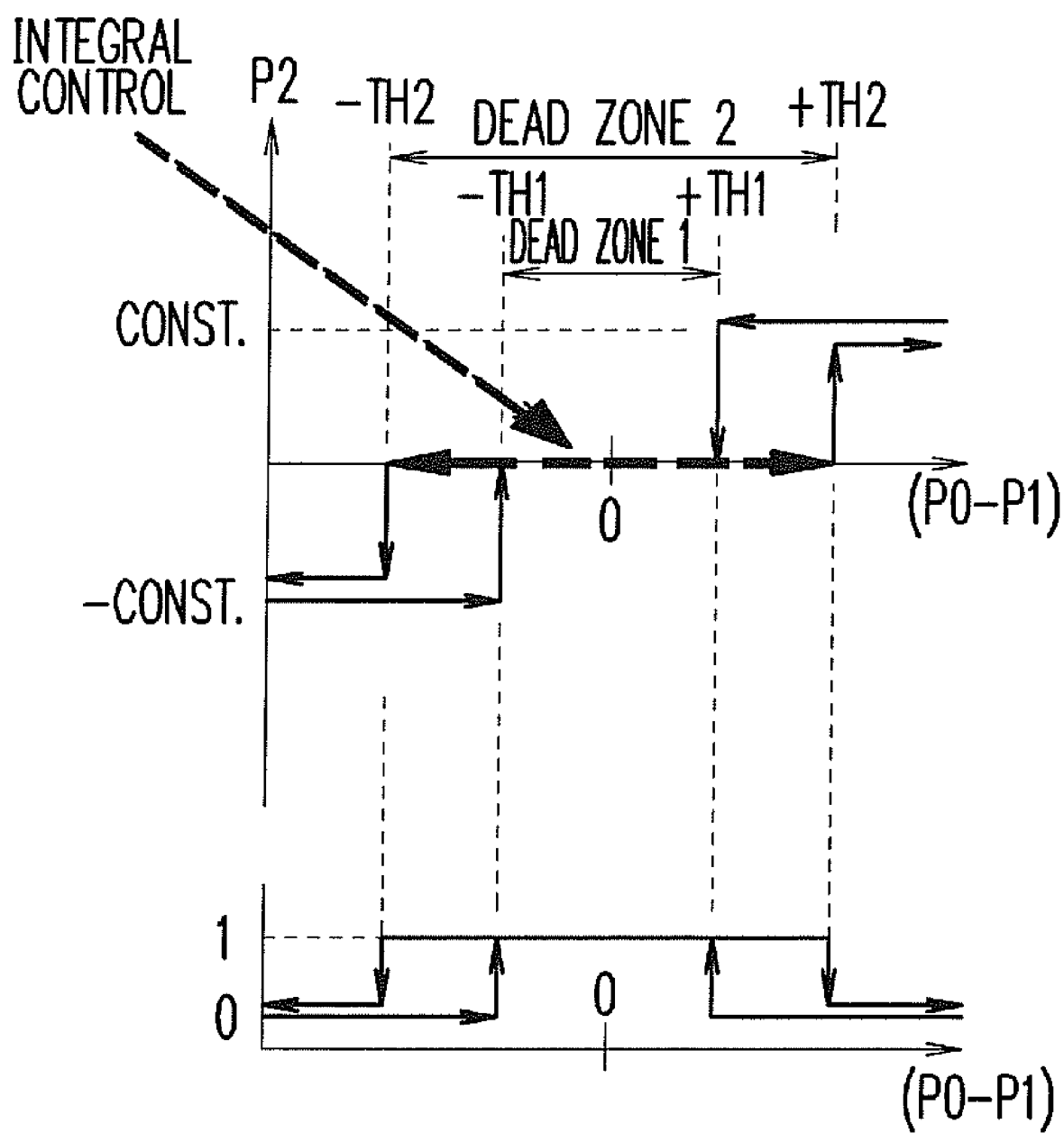
FIG. 14 is a view illustrating an operation outline of the feedback control according to the fourth exemplary embodiment of the present invention.

FIG. 14 illustrates the operation according to the feedback control illustrated in FIG. 13 as a polygonal line graph. A horizontal axis represents a result of comparison (P0−P1), and a vertical axis represents a feedback quantity P2 and a status of a status shift flag NFF. A solid line arrow in the graph represents a changing direction of (P0−P1). A thick dotted line arrow represents a portion of integral control.

Referring to FIG. 13 and FIG. 14, the feedback control according to the fourth exemplary embodiment will be described in detail.

First, if OCM 11 detects level P1 of the node output at the time of measurement (step S31), the detected value P1 is sent to a feedback control unit 15. When the status shift flag is NFF=1 at the time of previous detection (step S32; Yes) and the difference |P0−P1| between the sent detected value P1 and a control target value P0 is smaller than TH2 (step S33; No), the feedback control unit 15 sets the value which adds the mean value of the predetermined number of times of feedback quantity P2 to the old working quantity so far according to OEQ 12 as a new working quantity according to OEQ 12 (step S35). The status shift flag NFF=1 remains unchanged (step S36).

Furthermore, when the status shift flag is NFF=0 at the time of previous detection (step S32; No) and the difference |P0−P1| between the sent detected value P1 and a control target value P0 is smaller than TH1 (step S34; Yes), the feedback control unit 15 sets the value which adds the mean value of the predetermined number of times of feedback quantity P2 to the old working quantity so far according to OEQ 12 as a new working quantity according to OEQ 12 (step S35). In addition, the status shift flag is changed to NFF=1 (step S36).

Furthermore, when the status shift flag is NFF=1 at the time of previous detection (step S32; Yes) and the difference |P0−P1| between the sent detected value P1 and a control target value P0 is larger than TH2 (step S33; Yes), the feedback control unit 15 determines whether the detected value is larger than the target value or not (step S37).

If the detected value is larger than the target value (step S37; Yes), the feedback control is restarted so that the detected value is reduced (step S38).

If the detected value is smaller than the target value (step S37; No), the feedback control is restarted so that the detected value is increased (step S39).

In either case of step S38 or step S39, the status shift flag is changed to NFF=0 (step S40).

Furthermore, when the status shift flag is NFF=0 at the time of previous detection (step S32; No) and the difference |P0−P1| between the sent detected value P1 and a control target value P0 is larger than TH1 (step S34; No), the feedback control unit 15 determines whether the detected value is larger than the target value or not (step S37).

If the detected value is larger than the target value (step S37; Yes), the feedback control is performed so that the detected value is reduced (step S38).

If the detected value is smaller than the target value (step S37; No), the feedback control is performed so that the detected value is increased (step S39).

In either case of step S38 or step S39, the status shift flag NFF=0 remains unchanged (step S40).

As described above, according to the fourth exemplary embodiment of the present invention, the effect is the same as in the third exemplary embodiment described above. Furthermore, since the integral control that adds the mean value of the predetermined number of times of feedback quantity P2 is performed, even when (P0−P1) is within the dead zone, the optical output according to the node, that is, the detected value P1 can be approximated toward the control target value more quickly.

With respect to Each Exemplary Embodiment

Furthermore, each of above-described embodiments is the preferred embodiment of the present invention, and they can perform the present invention with a variety of modification based on the technical idea of the present invention without being limited to these embodiments.

For example, the configuration of the optical communication system or each node (optical transmission apparatus) is not limited to the configuration illustrated in FIG. 3 and FIG. 4 described above. In addition, it can also applicable in the same manner to use a variety of the optical direct amplified transmission system which sends the optical signal directly using the optical AMP without converting the received optical signal to the electric signal.

Furthermore, according to each embodiment described above, the processing procedure for implementing the optical transmission apparatus or the optical communication system is recorded in the recording medium as a program. For this reason, each function of the exemplary embodiments of the present invention can be implemented by making the CPU of the computer configuring the system process according to the program supplied from the recording medium.

In this case, the present invention is applicable even when the information group including the program is supplied to the output apparatus by the above-described recording medium or from the outer recording medium through the network.

That is, the program code, which is read from the recording medium, implements the new function of the present invention. Therefore, the recording medium stores the program code thereon and the signal read from the recording medium also makes up the present invention.

As a recording medium, for example, floppy (registered trademark) disk, hard disk, optical disk, optical magnetic disk, CD-ROM, CD-R, magnetic tape, nonvolatile memory card, ROM, or EEPROM may be used.

In the optical transmission apparatus by the program according to the present invention, each function of the optical transmission apparatus in the respective exemplary embodiments of the above-described invention may be implemented.

As described above, the optical feedback control unit according to the present invention comprises an optical output control portion and a detection portion. In the optical feedback control unit, the optical output control portion determines an optical output by a feedback control using the result detected by the detection portion. Furthermore, in this case, a dead zone not performing the feedback control is set for the difference between the detected value from the detection portion and the control target value. Furthermore, when the difference between the detected value and the control target value is within the dead zone, a width of the dead zone is set to be wider than that of the dead zone when the difference between the detected value and the control target value is out of the dead zone.

When the difference between the detected value and the control target value is out of the dead zone, the width of the dead zone may be set so as to be larger width than a level change width by the variable element which would be intended to be excluded from the response object through the feedback control.

When the difference between the detected value and the control target value is out of the dead zone, a feedback quantity by the optical output control portion may preferably be constant.

When the difference between the detected value and the control target value is out of the dead zone, the feedback quantity by the optical output control portion may be controlled so as to be larger in response to the difference between the detected value and the control target value.

When the difference between the detected value and the control target value is within the dead zone, a new working quantity by the optical output control portion may be feedback-controlled so as to become larger by only the mean value of the predetermined number of times of feedback quantity.

The optical transmission apparatus according to the present invention comprises the optical feedback control unit.

Furthermore, an optical communication system according to the present invention is configured such that a plurality of optical transmission apparatuses including the optical feedback control unit described above is connected in a cascade through an optical transmission path between an optical sending apparatus and an optical receiving apparatus.

Furthermore, a feedback control method according to the present invention includes detecting an optical level to be output and optical-output controlling for determining an optical output by a feedback control using the result detected by the detecting. In the feedback control method, a dead zone not performing the feedback control is set for the difference between the detected value due to the detecting and the control target value. Furthermore, when the difference between the detected value and the control target value is within the dead zone, a width of the dead zone is set to be wider than that of the dead zone when the difference between the detected value and the control target value is out of the dead zone.

When the difference between the detected value and the control target value is out of the dead zone, a feedback quantity in the optical-output controlling may preferably be constant.

When the difference between the detected value and the control target value is out of the dead zone, the feedback quantity in the optical-output controlling may be controlled so as to be larger in response to the difference between the detected value and the control target value.

When the difference between the detected value and the control target value is within the dead zone, a new working quantity in the optical-output controlling may be feedback-controlled so as to become larger by only the mean value of the predetermined number of times of feedback quantity.

Furthermore, a recording medium according to the present invention records a feedback control program that executes a detection process for detecting an optical level to be output and an optical output control process for determining an optical output by a feedback control using the result detected by the detection process in a computer. In the recording medium, a dead zone not performing the feedback control is set for the difference between the detected value from the detection process and the control target value. Furthermore, when the difference between the detected value and the control target value is within the dead zone, a width of the dead zone is set to be wider than that of the dead zone when the difference between the detected value and the control target value is out of the dead zone.

When the difference between the detected value and the control target value is out of the dead zone, a feedback quantity in the optical output control process may preferably be constant.

When the difference between the detected value and the control target value is out of the dead zone, the feedback quantity in the optical output control process may be controlled so as to be larger in response to the difference between the detected value and the control target value.

When the difference between the detected value and the control target value is within the dead zone, a new working quantity in the optical output control process may be feedback-controlled so as to become larger by only the mean value of the predetermined number of times of feedback quantity.

As described above, according to the present invention, for example, even when used in the system to which a plurality of nodes is connected, the unstable system may become stable by the proper feedback control without being affected by the optical level change according to the polarized variation or the loss variation. For this reason, even in an environment where a variety of variable elements exist, an operation can be stabilized by the feedback control.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical feedback control unit comprising a detection unit and an optical output control unit determining an optical output by a feedback control using a result detected from the detection unit,
wherein a dead zone not performing the feedback control is set for a difference between a detected value from the detection unit and a control target value, and
a width of the dead zone when the difference between the detected value and the control target value is within the dead zone, is set to be wider than that of the dead zone when the difference between the detected value and the control target value is out of the dead zone.

2. The optical feedback control unit according to claim 1, wherein the width of the dead zone when the difference between the detected value and the control target value is out of the dead zone, is set to be wider than a level variation width due to variable elements intended to be excluded from response objects by the feedback control.

3. The optical feedback control unit according to claim 1, wherein a feedback quantity by the optical output control unit is made constant when the difference between the detected value and the control target value is out of the dead zone.

4. The optical feedback control unit according to claim 1, wherein a feedback quantity by the optical output control unit is controlled to be larger in response to the difference between the detected value and the control target value when the difference between the detected value and the control target value is out of the dead zone.

5. The optical feedback control unit according to claim 1, wherein a new working quantity by the optical output control unit is feedback-controlled to be larger by a mean value of a predetermined number of times of feedback quantity when the difference between the detected value and the control target value is within the dead zone.

6. An optical feedback control unit comprising detection means and optical output control means determining an optical output by a feedback control using a result detected from the detection means,
wherein a dead zone not performing the feedback control is set for a difference between a detected value from the detection means and a control target value, and a width of the dead zone when the difference between the detected value and the control target value is within the dead zone, is set to be wider than that of the dead zone when the difference between the detected value and the control target value is out of the dead zone.

7. An optical communication system comprising a plurality of optical transmission apparatuses including the optical feedback control unit according to claim 1,
wherein, the plurality of optical transmission apparatuses are connected in a cascade through an optical transmission path between an optical sending apparatus and an optical receiving apparatus.

8. A feedback control method comprising:
a detecting step to detect an optical level output and an optical output control step to determine an optical output by a feedback control using a result detected from the detecting step,
wherein a dead zone not performing the feedback control is set for a difference between a detected value from the detecting step and a control target value, and
a width of the dead zone when the difference between the detected value and the control target value is within the dead zone, is set to be wider than that of the dead zone when the difference between the detected value and the control target value is out of the dead zone.

9. The feedback control method according to claim 8,
wherein a feedback quantity by the optical output control step is made constant when the difference between the detected value and the control target value is out of the dead zone.

10. The feedback control method according to claim 8, wherein a feedback quantity by the optical output control step is controlled to be larger in response to the difference between the detected value and the control target value when the difference between the detected value and the control target value is out of the dead zone.

11. The feedback control method according to claim 8, wherein a new working quantity by the optical output control step is feedback-controlled to be larger by a mean value of a predetermined number of times of feedback quantity when the difference between the detected value and the control target value is within the dead zone.

12. A recording medium recording a feedback control program that executes a detection process to detect an optical level output and an optical output control process to determine an optical output by a feedback control using a result detected from the detection process in a computer,
wherein a dead zone not performing the feedback control is set for a difference between a detected value from the detection process and a control target value, and
a width of the dead zone when the difference between the detected value and the control target value is within the dead zone, is set to be wider than that of the dead zone when the difference between the detected value and the control target value is out of the dead zone.

13. The recording medium recording a feedback control program according to claim 12, wherein a feedback quantity by the optical output control process is made constant when the difference between the detected value and the control target value is out of the dead zone.

14. The recording medium recording a feedback control program according to claim 12, wherein a feedback quantity by the optical output control process is controlled to be larger in response to the difference between the detected value and the control target value when the difference between the detected value and the control target value is out of the dead zone.

15. The recording medium recording a feedback control program according to claim 12, wherein a new working quantity by the optical output control process is feedback-controlled to be larger by a mean value of a predetermined number of times of feedback quantity when the difference between the detected value and the control target value is within the dead zone.

* * * * *